United States Patent [19]
Postrihac

[11] 3,944,408
[45] Mar. 16, 1976

[54] METHOD FOR PRODUCING BIOLOGICAL FERTILIZERS FROM SEWAGE

[76] Inventor: Rudolf Postrihac, Gerichtsgasse 1g, 1210 Vienna, Austria

[22] Filed: Mar. 14, 1974

[21] Appl. No.: 451,201

[30] Foreign Application Priority Data
Mar. 20, 1973 Austria ............................. 2464/73

[52] U.S. Cl. ..................... 71/13; 71/25; 71/64 G
[51] Int. Cl.² ... C05F 3/00; C05F 7/00; C05F 11/00
[58] Field of Search ........... 71/1, 11, 12, 13, 15, 22, 71/23, 24, 25, 31, 37, 39, 64 G

[56] References Cited
UNITED STATES PATENTS

| | | | |
|---|---|---|---|
| 517,661 | 4/1894 | Powter | 71/23 |
| 943,669 | 12/1909 | Ellis | 71/31 |
| 1,810,802 | 6/1931 | Travers et al. | 71/11 |
| 1,933,445 | 10/1933 | Murdock | 71/24 X |
| 2,087,781 | 7/1937 | Randolph | 71/24 X |
| 2,117,087 | 5/1938 | Formhals | 71/24 X |
| 2,813,014 | 11/1957 | Allison et al. | 71/11 |
| 3,141,759 | 7/1964 | Usse et al. | 71/25 X |
| 3,241,943 | 3/1966 | Bystrom | 71/25 X |

*Primary Examiner*—Frank A. Spear, Jr.
*Assistant Examiner*—Ferris H. Lander
*Attorney, Agent, or Firm*—Spencer & Kaye

[57] ABSTRACT

A biological fertilizer is prepared by a process which comprises treating sewage sedimentation sludge with sulphite waste liquor, the treatment being carried out at a pH of no more than 6, followed by mixing the mixture of treated sludge and waste liquor with pulverized vegetable matter, whereby to form a biological fertilizer.

21 Claims, No Drawings

METHOD FOR PRODUCING BIOLOGICAL FERTILIZERS FROM SEWAGE

BACKGROUND OF THE INVENTION

1. Field of the Invention

The invention relates to a method of producing fertilizers from sewage.

The sewage may be domestic, industrial or agricultural sewage.

2. Description of the Prior Art

Domestic sewage represents the main problem in water pollution and its proportion of the total environmental pollution is estimated to be 63%. The remaining 37% is divided between industry and agriculture. Industry at least is endeavouring, albeit with considerable technical difficulty and financial expenditure, to restrict the discharge of contaminants into watercourses. The bulk of domestic sewage with its high proportion of natural biological constituents, which include some of thhe most valuable nutrients for the plant world, is for the most part, however, wasted unutilized.

The conventional treatment of sewage comprises introducing it into a clarifying tank, which brings about the settling of the solid particles, and then subjecting it to a "digestion" process in a digestion tank. The oxidation process thus aimed at here, which is necessitated by the presence of large quantities of what are known as "convenience chemicals of the affluent society" in domestic sewage, is considerably impeded or even rendered impossible. These "convenience chemicals", by which there are meant inter alia detergents, wetting agents, acids, alkalis, aromatics, and organic fats, etc., largely exclude even minimal oxidation processes. In addition it happens that digestion tanks constitute a breeding ground for bacteria and parasites. The result of such a digestion process is therefore not an activated sludge which is very suitable for further use but, rather, a biologically "dead" mass which, for example, is absolutely diametrically opposed to the requirements for natural plant growth. In this connection it has even been proposed to completely eliminate this non-utilizable mass by burning it, which, on the one hand, involves high costs (about 12 to 16 DM/m$^3$) and, on the other hand, excludes any possibility of biological utilization.

SUMMARY OF THE INVENTION

It has now been discovered that it is possible to treat sewage of all types with certain undesirable industrial waste products and obtain a biologically valuable product. The invention is based on the idea of subjecting the mass obtained from the settling or clarification of sewage, designated sewage sedimentation sludge, to a specific treatment with waste products resulting from chemical wood processing, and then converting this material into a biologically valuable product.

According to the present invention there is provided a process for the production of a biological fertilizer, which process comprises treating sewage sedimentation sludge with sulphite waste liquor, the treatment being carried out at a pH of no more than 6, followed by mixing the mixture of treated sludge and sulphite waste liquor with pulverized vegetable matter whereby to form a biological fertilizer.

DESCRIPTION OF THE PREFERRED EMBODIMENTS

The sludge may be domestic, industrial or agricultural sewage. An alumina product may be added to the sulphite waste liquor prior to reaction. It is desirable to store the biological fertilizer before use.

The method, of the invention makes it possible to process the sedimentation sludge from sewage, which occurs in large amounts and is difficult to dispose of, in a simple, technically inexpensive treatment operation, and to convert the constituents of the sludge into a biologically valuable fertilizer which is free of pathogenic organisms and can therefore be safely employed. At the same time a generally worthless and troubelsome by-product resulting from the manufacture of paper, from the production of cellulose, or from the decomposition of the wood with bisulphites may be utilized. This sulphite waste liquor occurring in large quantities such as "green liquor" has been customarily allowed to flow unused into rivers, lakes or seas, or has been burnt after dehydration. The method of the invention has therefore, in addition to the remarkable effect of the unimpeded completion of the oxidation processes in the sedimentation sludge, the advantage of the efficient utilization of a hitherto largely worthless by-product thus avoiding the pollution of watercourses, or the destruction of the liquor by dehydration and combustion. Consequently, it is possible to utilize the biological residual substances present in the sulphite waste liquor which apparently originate from the dead biological wood cells. The biological process and chemical reactions occurring separately during these operations are not known in detail but there is achieved in this case the already mentioned remarkable double effect regarding the sedimentation sludge and the sulphite waste liquor. There is thus brought about the decomposition of the contaminants contained in the sewage and the commencement or continuation of the oxidation of the biological substances contained therein; simultaneously, the formation of breeding grounds for harmful parasites and the like is prevented. There is also made possible the complete and extremely beneficial utilization of the sulphite waste liquors from the paper and pulping industries by making use of the biological substances still present therein, while eliminating the cost of the senseless (from a biological point of view) destruction of these waste liquors and at the same time preserving natural watercourses. The process of the invention makes a very important contribution to the cleanliness of the environment by the combined treatment of domestic sewage and disposal of the harmful sulphite waste liquors arising from paper and pulp factories.

The sulphite waste liquor, which in the known chemical processes for wood decomposition is produced from calcium bisulphite, magnesium bisulphite or sodium bisulphite, can be used in the method of the invention irrespective of its origin. This applies not only to green liquor, such as is produced directly from wood decomposition, but also to partially or wholly neutralized or alkalized, sulphite waste liquor and to sulphite waste liquor concentrate. Preferably, however, the green liquor arising in the paper or cellulose industry is used without aftertreatment because conventional aftertreatments of the green liquor lead to coagulation of the lignin contained therein. Advantageously in the method of the invention the sulphite waste is green liquor of the concentration produced in the production of paper or cellulose. If desired, it is also possible to utilize green liquor diluted with water, in particular in a dilution of green liquor of up to 5 times its volume. If a sulphite waste liquor concentrate is used to start with, then for the method according to the invention this concentrate is advantageously diluted with water to the concentration of green liquor or even beyond that in accordance with the above.

The quantity of sulphite waste liquor used depends on the composition of the sedimentation sludge and the nature of its constituents. It is preferred that the sludge be treated with 5 to 30% by volume of undiluted green liquor, or with a corresponding amount of diluted green liquor.

As to the optional alumina product, it is preferred to add red mud from aluminium production to the sulphite waste liquor, preferably in a quantity of from 5 to 10% by weight based on the weight of the sulphite waste liquor (green liquor), or a corresponding amount of bauxite containing a low proportion of alumina.

Attention has to be paid during the treatment of the sedimentation sludge with the sulphite waste liquor to ensure that the prescribed pH value of 6 is not exceeded. For the adjustment of the pH to this value of no more than 6, preferably to a pH of from 5 to 6, it is preferable to use an oxidizing acid, such as nitric acid, possibly using at the same time an organic acid such as oxalic or citric acid.

It is preferred that the oxidation of the sedimentation sludge in the presence of sulphite waste liquor is carried out at the lowest temperatures possible. Generally, it is possible to go up to 25°C or only slightly above. The temperature range of 10° to 15°C is most preferred.

The treatment of the sludge with sulphite waste liquor is effected in a mixing process which is preferably carried out with continuous stirring. Preferably the mixing is carried out for about 12 hours.

Pulverized vegetable matter of any type is suitable for the conversion of the treated sludge into a biological fertilizer. For such a loosening constituent there may be used shredded peat or peat litter, chopped straw, grass cuttings or other pulverized vegetable waste, such as grass, twigs and leaves. The pH value of the sludge may then rise to about 6.8 even before the admixing of the vegetable matter. The mixture of treated sludge and vegetable matter is then left to stand so as to ensure its complete conversion into a fertilizer. A period of about one month is generally sufficient time for this, possibly even less.

To accelerate the conversion into a biological fertilizer aeration, which if necessary may be repeated, and/or the addition of oxidizing agents such as nitric acid or peroxides have proved to be very advantageous.

In accordance with one aspect of the invention the conversion of the treated silt (sedimentation sludge) into a biological fertilizer may be further assisted by the application of an electro-chemical potential to the material undergoing treatment, for example by forming the wall surfaces of the mixing tank as a copper-aluminum pair.

Finally, the biological fertilizer obtained in the manner described above, having been stored for about one month, may be mixed with small amounts of additional fertilizer constituents containing calcium, potassium, nitrogen or the like in the form of, for example, ground limestone, potassium compounds, ammonium compounds, nitrates and/or fluorides.

In the method of the invention it is preferred to use sewage that has been caused to settle to such an extent that it is still essentially viscous. In the feeding operation of the sludge to the tank in which the process of the invention is carried out which advantageously is combined with a mixing operation, green liquor is admixed with the sludge, preferably in a proportion of from about 5 to 10% of its volume. This green liquor may have been previously mixed with an alumina product, e.g., with 8 to 10% of red mud (waste from aluminum production) or with a low-grade bauxite. The mixing process may be continued for several hours in the mixing tank and the pH value is kept at pH 6 or below. In addition to aeration effected during the mixing process, oxidizing agents may be used, for example nitric acid (pH = 1) or an organic acid such as oxalic acid or citric acid.

The addition of vegetable matter as a loosening agent to the treated sludge, now adjusted to the desired pH value (e.g. 6.8), is again effected by a mixing process in which case shredded peat, biological waste such as chopped straw, grass and plant cuttings, are added. To increase the effectiveness of the constituents of the sulphite waste liquor it is advantageous if permanently weak electric currents (micro-currents) are maintained in the mixing tank. For this purpose it is possible, for example, for one mixing tank wall to have an aluminum surface and the other wall a copper surface, said walls being connected to one another conductively outside the tank, thus giving rise to an electro-chemical cell.

After the intimate mixing of the treated sludge with the vegetable matter has been completed, and after a storage time of 1 month, if necessary together with any interim re-storage of the material being mixed, has elapsed, there is obtained a highly active, biological fertilizer suitable for all plant species and which compared to known fertilizers generally brings about improved plant growth.

The processes which occur during the treatment of the sludge with sulphite waste liquor in the mixing tank may be summarized as comprising the decomposition of the various convenience chemicals, such as detergents, wetting agents etc., and also the conversion of sewer gas and methane while avoiding smells. The most important process occurring here is of course the oxidation of the biological and other constituents and also the decomposition of organic fats, tar products, etc. Moreover a type of inmunization of the biological substances of the faeces against harmful parasites is effected, resulting in a restriction of the nutrient media suitable for these parasites.

The invention is illustrated, by way of example only, in the following non-limiting Examples.

EXAMPLE 1

Part A

Domestic sewage collected from a housing estate was firstly conducted into a conventional clarifying tank provided with continuous mixing equipment and was then passed to a settling tank. The sedimentation mass (sewage sedimentation sludge) which settled in the settling tank underwent subsequent treatment in a still liquid to viscous state.

This sedimentation sludge then had admixed with it sulphite waste liquor to which 8% by volume red mud had been added. The sulphite waste liquor was undiluted green liquor resulting from the decomposition of wood with calcium bisulphite. The mixture of sulphite waste liquor with the admixtures mentioned above was added to the sedimentation mass in a volume ratio of about 1:10.

The mixing operation was carried out in the settling tank, intimate mixing being effected by continuous agitation. It was demonstrated that even with a mixing time of 5 to 6 minutes the sedimentation was already odourless. In this way the liberation and escape of hydrogen sulphide and other strong-smelling or noxious gases arising from the sedimentation sludge were eliminated in the shortest possible time.

During the course of the mixing operation and, in particular, at its commencement, care was taken to ensure that the pH value of the sedimentation mass in no case rose above pH 6. A pH value of higher than 6 has to be reduced by the addition of acid, e.g. by means of dilute nitric acid (10%). The temperature was kept as low as possible during the entire mixing operation, i.e., at room temperature, and it was not allowed to rise above about 25°C.

At the end of the mixing operation (about 12 hours.) the sludge treated in the aforementioned manner contained all the contaminants and pollutants which were present in the sewage in a combined form which constituted no danger or threat to the environment.

Part B

The still relatively viscous mass obtained in accordance with Example 1 after the approximately 12 hour mixing operation was fed to another tank, and the pH of the mass was adjusted to a value of 6.8 by the addition of 1 to 2% potassium hydroxide. The mass was then mixed with pulverized vegetable matter as a loosening constituent. Shredded peat litter was used as the pulverized vegetable matter. Medium length chopped straw or the like or pulverized waste vegetable matter such as grass, twigs, leaves could also have been used in place of the peat. The mass thus obtained was left to stand for at least one month, the treated sludge being converted with complete decomposition of any remaining contaminants into a biological fertilizer.

This latter was completely free of harmful parasites, maggots, disease-carrying germs and gave rise to an extremely effective fertilizer for all plants and soils. In the case of cereals, vegetables, foliage plants, as well as deciduous trees, fruit trees and coniferous trees a 30 to 60% increase in growth was observed. In soils, in which previously no earth-worms were to be found, the presence of an abundance of earth-worms was noted about 1 year after addition of the fertilization. It is well known that worms only thrive in absolutely healthy soils. Plants fertilized with the fertilizer proved to be absolutely healthy and extremely resistant to disease and pests.

EXAMPLE 2

The solids from a domestic sewage disposal plant are generally pumped out half-yearly, or even more often. In this Example such domestic solids were fed to a clarifying tank and treated in the same way as in Example 1 part A An absolutely odourless sludge was obtained which was harmless to the environment and which gave rise to an excellent fertilizer after being mixed with chopped straw and after being left to stand for about 1 month.

EXAMPLE 3

Faeces and liquid manure from animal feeding stalls which had a particularly large proportion of pollutants and contaminants, was treated as in Example 1 part A except that the sulphite waste liquor was added to the sewage in a greater proportion (volume ratio approximately 1:5). This faeces and manure were converted into a practically odourless sludge in a mixing operation lasting about 1 day. The transformation of this sludge into an especially high-grade biological fertilizer was effected in the same way as in Example 1 part B.

I claim:

1. A process for preparing a biological fertilizer which comprises treating sewage sedimentation sludge with sulphite waste liquor, at a pH of no more than 6, at a temperature of up to about 25°C, under oxidizing conditions to form a reaction product, and mixing the reaction product with pulverized vegetable matter to form a biological fertilizer.

2. A process according to claim 1, wherein the sulphite waste liquor is green liquor resulting from paper or cellulose production.

3. A process according to claim 2, wherein the sludge is treated with from 5 to 30% by volume of the green liquor.

4. A process according to claim 1, wherein the sludge is treated with green liquor resulting from paper or cellulose production diluted with up to 5 times its volume of water.

5. A process according to claim 1, wherein the sulphite waste liquor contains an alumina product.

6. A process according to claim 5, wherein the alumina product is red mud from alumina production.

7. A process according to claim 6, wherein the red mud is present in an amount of from 5 to 10% based on the weight of the sulphite waste liquor.

8. A process according to claim 5, wherein the alumina product is bauxite containing a low proportion of alumina.

9. A process according to claim 1, wherein the treatment of the sludge with the sulphite waste liquor is carried out at a pH of from 5 to 6.

10. A process according to claim 1 wherein the pH is controlled by the addition of an acid selected from the group consisting of oxidizing acids and mixtures of oxidizing acids with organic acids.

11. A process according to claim 10, wherein the acid is selected from the group consisting of nitric acid, and mixtures of nitric acid with an organic acid selected from the group consisting of citric and oxalic acid.

12. A process according to claim 1, wherein the said treatment is carried out at a temperature of from 10° to 15°C.

13. A process according to claim 1, wherein the treatment of the sludge with the sulphite waste liquor is carried out for about 12 hours.

14. A process according to claim 1, wherein the vegetable matter is selected from the group consisting of shredded peat, peat litter, chopped straw and grass cuttings.

15. A process according to claim 1, wherein the pH of the reaction product is maintained at no more than 6.8 during the said mixing step with the pulverized vegetable matter.

16. A process according to claim 1, wherein the conversion of the reaction product into a biological fertilizer is accelerated by aeration.

17. A process according to claim 1, wherein the conversion of the reaction product into a biological fertilizer is accelerated by the addition of an oxidizing agent.

18. A process according to claim 1, wherein the conversion of the reaction product into a biological fertilizer is assisted by the application of an electro-chemical potential to the mixture of the reaction product and pulverized vegetable matter.

19. A process according to claim 18, wherein the potential is applied by carrying out the mixing of the reaction product in a mixing tank the wall surfaces of which are formed as a copper-aluminium pair.

20. A process according to claim 1, wherein the biological fertilizer is stored for about 1 month after production.

21. A process for the preparation of a biological fertilizer, which process comprises treating sewage sedimentation sludge with from 5 to 30% by volume of green liquor resulting from paper or cellulose production, the green liquor containing from 5 to 10% by weight of an alumina product selected from the group consisting of red mud and bauxite containing a low proportion of alumina, the treatment being carried out at a pH of from 5 to 6, and at a temperature of up to 25°C, followed by mixing the mixture of treated sludge and green liquor with pulverized vegetable matter, said vegetable matter being selected from the group consisting of shredded peat, peat litter, chopped straw and grass cuttings, to form a biological fertilizer, and then storing said biological fertilizer for at least about 1 month after production.

* * * * *